United States Patent
Dago et al.

(10) Patent No.: US 11,837,953 B2
(45) Date of Patent: Dec. 5, 2023

(54) SWITCHED CAPACITOR CONVERTER, CORRESPONDING METHOD, POWER SUPPLY SYSTEM AND ELECTRONIC DEVICE

(71) Applicant: STMicroelectronics S.r.l., Agrate Brianza (IT)

(72) Inventors: Alessandro Dago, Milan (IT); Alessandro Gasparini, Cusano Milanino (IT); Osvaldo Enrico Zambetti, Milan (IT); Salvatore Levantino, Milan (IT); Massimo Antonio Ghioni, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/869,508

(22) Filed: Jul. 20, 2022

(65) Prior Publication Data
US 2023/0034786 A1    Feb. 2, 2023

(30) Foreign Application Priority Data

Jul. 30, 2021   (IT) .................. 102021000020597

(51) Int. Cl.
  *H02M 3/07*  (2006.01)
  *H02M 3/00*  (2006.01)
  *H02M 1/00*  (2006.01)

(52) U.S. Cl.
CPC ............. *H02M 3/00* (2013.01); *H02M 1/007* (2021.05); *H02J 2207/20* (2020.01)

(58) Field of Classification Search
CPC ....... H02J 2207/20; H02M 1/007; H02M 3/07
(Continued)

(56) References Cited

U.S. PATENT DOCUMENTS 9,793,794 B2   10/2017  Stauth et al.
11,509,146 B1*  11/2022  Zhang ................. H02J 7/00714
(Continued)

FOREIGN PATENT DOCUMENTS

WO   2020119817 A1   6/2020

OTHER PUBLICATIONS

IT Search Report and Written Opinion for priority application, IT 102021000020597, report dated Apr. 7, 2022, 8 pgs.

*Primary Examiner* — William Hernandez
(74) *Attorney, Agent, or Firm* — CROWE & DUNLEVY

(57) ABSTRACT

First and second circuit branches are coupled between an input node and ground. Each circuit branch includes a series coupling first-fourth transistors in a current flow path with an output node. A first capacitor is coupled between a first capacitor node and a second capacitor node intermediate the first transistor and the second transistor in the first circuit branch. A second capacitor is coupled between a third capacitor node and a fourth capacitor node intermediate the first transistor and the second transistor in the second circuit branch. An inter-branch circuit block between the first and second branches includes a first inter-branch transistor coupled between the first capacitor node in the first circuit branch and the fourth capacitor node in the second circuit branch and a second inter-branch transistor coupled between the third capacitor node in the second circuit branch and the second capacitor node in the first circuit branch.

15 Claims, 9 Drawing Sheets

(58) Field of Classification Search
USPC ....... 307/31, 82; 323/282, 315, 317; 363/59, 363/60, 65, 123
See application file for complete search history.

(56) References Cited

U.S. PATENT DOCUMENTS

| | | |
|---|---|---|
| 2007/0296383 A1 | 12/2007 | Xu et al. |
| 2021/0083571 A1 | 3/2021 | Giuliano et al. |
| 2021/0194364 A1* | 6/2021 | Jung ........................ H02J 7/007 |
| 2023/0010260 A1* | 1/2023 | Song ...................... H02J 7/0047 |
| 2023/0097692 A1* | 3/2023 | Liu ........................ H02M 3/072 |
| | | 363/60 |
| 2023/0134427 A1* | 5/2023 | Liu ........................... H02M 3/07 |
| | | 323/271 |
| 2023/0155478 A1* | 5/2023 | Zhao ................... H02M 1/0058 |
| | | 363/13 |
| 2023/0155492 A1* | 5/2023 | Zhao ................... H02M 1/0058 |
| | | 323/235 |
| 2023/0155494 A1* | 5/2023 | Zhao ....................... H02M 3/07 |
| | | 363/13 |

\* cited by examiner

SWITCHED CAPACITOR CONVERTER, CORRESPONDING METHOD, POWER SUPPLY SYSTEM AND ELECTRONIC DEVICE

PRIORITY CLAIM

This application claims the priority benefit of Italian Application for Patent No. 102021000020597, filed on Jul. 30, 2021, the content of which is hereby incorporated by reference in its entirety to the maximum extent allowable by law.

TECHNICAL FIELD

The description relates to electronic converting circuits and methods, such as switched capacitor converter (SCC) topologies, for instance.

One or more embodiments can be used in switched DC-DC voltage converters to provide a regulated DC power supply, for instance.

BACKGROUND

DC-DC voltage converters employing the switched capacitor converter (SCC) type differ from other topologies, such as the known buck or boost converters, for the use of capacitors as energy storing devices. Optionally, a resonant inductor having a reduced size with respect to the inductor employed in buck or boost converter topologies can be introduced to reduce the charging/discharging losses (currently referred to as inherent power losses) of the capacitors. This is accomplished while preserving high power density thanks to the reduced size of the resonant inductor configured to resonate with the capacitors at the switching frequency of the SCC.

In a conventional SCC circuit, the output voltage corresponds to the input voltage scaled (up or down) by a fixed conversion ratio based on the specific circuit topology, such as the series-parallel, the Dickson, the cascaded-doubler and the ladder topologies, for instance.

Introducing the resonant inductor also provides the possibility to regulate the output voltage of the SCC in a continuous manner.

Extensive literature has been devoted to SCC circuit topologies, as witnessed, e.g., by the following references (each of which is incorporated herein by reference):
[1] S. Jiang, et al., "Switched Tank Converters," IEEE Transactions on Power Electronics, vol. 34, no. 6, pp. 5048-5062, June 2019, doi: 10.1109/TPEL.2018.2868447, which presents a new class of switched tank converters (abbreviated as STCs) that employ LC resonant tanks to partially replace the flying capacitors for energy transfer; wherein multiple STCs can operate in parallel with inherent droop current sharing, offering scalability and control simplicity;
[2] C. Schaef, et al., "A 3-Phase Resonant Switched Capacitor Converter Delivering 7.7 W at 85% Efficiency Using 1.1 nH PCB Trace Inductors," in IEEE Journal of Solid-State Circuits, vol. 50, no. 12, pp. 2861-2869, December 2015, doi: 10.1109/JSSC.2015.2462351, which discusses switched capacitor (SC) converters, in particular a resonant switched capacitor (ReSC) topology that introduces a small amount of inductance in series with the flying capacitor, eliminating charge-sharing losses and thus allowing efficient operation in a low-cost process option, where the three-phase interleaved topology can deliver up to 7.7 W at 85% efficiency (power density of 0.91 W/mm 2 or 6.4 kW/in 3) using a bootstrapped n-channel power train and single-digit nH inductors embedded in a flip-chip assembly;
[3] M. D. Seeman, et al., "Analysis and Optimization of Switched-Capacitor DC-DC Converters," in IEEE Transactions on Power Electronics, vol. 23, no. 2, pp. 841-851, March 2008, doi: 10.1109/TPEL.2007.915182, which discusses analysis methods that fully determine a switched-capacitor (SC) DC-DC converter's steady-state performance through evaluation of its output impedance, where the simple formulation developed permits optimization of the capacitor sizes to meet a constraint such as a total capacitance or total energy storage limit, and also permits optimization of the switch sizes subject to constraints on total switch conductances or total switch volt-ampere (V-A) products, where the performance (based on conduction loss) of a ladder-type converter is found to be superior to that of a conventional magnetic-based converter for medium to high conversion ratios; and
[4] Y. Li, et al., "Resonant switched capacitor stacked topology enabling high DC-DC voltage conversion ratios and efficient wide range regulation," 2016 IEEE Energy Conversion Congress and Exposition (ECCE), 2016, pp. 1-7, doi: 10.1109/ECCE.2016.7855401, which presents a stacked-topology resonant switched-capacitor DC-DC converter to achieve a high voltage conversion ratio, where the topology can be generalized to any N-to-1 DC-DC conversion application with only a single inductor.

Existing solutions may suffer from one or more of the following drawbacks: in SCC circuits based on a ladder topology, the number of capacitors grows twice as fast in comparison with other topologies having a conversion ratio 1/N lower than ½; and area footprint may be a concern in SCC circuits based on a ladder topology, Dickson and doubler topologies involve capacitors and transistors having a relatively high rating, that is the maximum voltage applied to a device during steady state operation, while a low voltage rating improves performance of a device, using components (capacitors and transistors) with a higher voltage rating results in degradation of performance of the converter.

There is a need in the art to overcome the aforementioned drawbacks.

SUMMARY

One or more embodiments may relate to a circuit.
An electronic converter of the switched capacitor circuit, SCC, type may be exemplary of such a circuit.
One or more embodiments may relate to a corresponding method.
One or more embodiments may relate to a corresponding power supply system (equipped on a mobile electronic device, for instance).
One or more embodiments facilitate obtaining high power densities both in discrete and integrated solutions, thanks to a higher energy density of the capacitors with respect to the inductors.
One or more embodiments facilitate providing a ladder-type SCC circuit that can perform conversion using a reduced number of components having a relatively low voltage rating for any conversion ratio 1/N with integer $N \geq 3$.

In particular, embodiments reduce the total area occupancy with respect to conventional ladder converters with a like efficiency or output resistance.

One or more embodiments show an improved performance with respect to other converter circuit topologies (such as Dickson and doubler, for instance), thanks to lower voltage ratings of the components.

One or more embodiments exploit phase interleaving to provide a DC current path from input to output.

One or more embodiments involve a reduced number of transistors per interleaving leg with respect to conventional topologies.

One or more embodiments exploit the ladder topology to features an improve use of both passive and active components, leading to superior figures of merit, like efficiency and/or device cost, for instance.

One or more embodiments further features a lower number of capacitors, in particular for high conversion-ratios.

One or more embodiments facilitate providing a bus DC-DC converter having high and fixed step-down conversion ratio with high efficiency.

BRIEF DESCRIPTION OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals and a corresponding description will not be repeated for brevity.

The references used herein are provided merely for convenience and hence do not define the extent of protection or the scope of the embodiments.

For the sake of simplicity, in the following detailed description a same reference symbol may be used to designate both a node/line in a circuit and a signal which may occur at that node or line.

Figure 1:
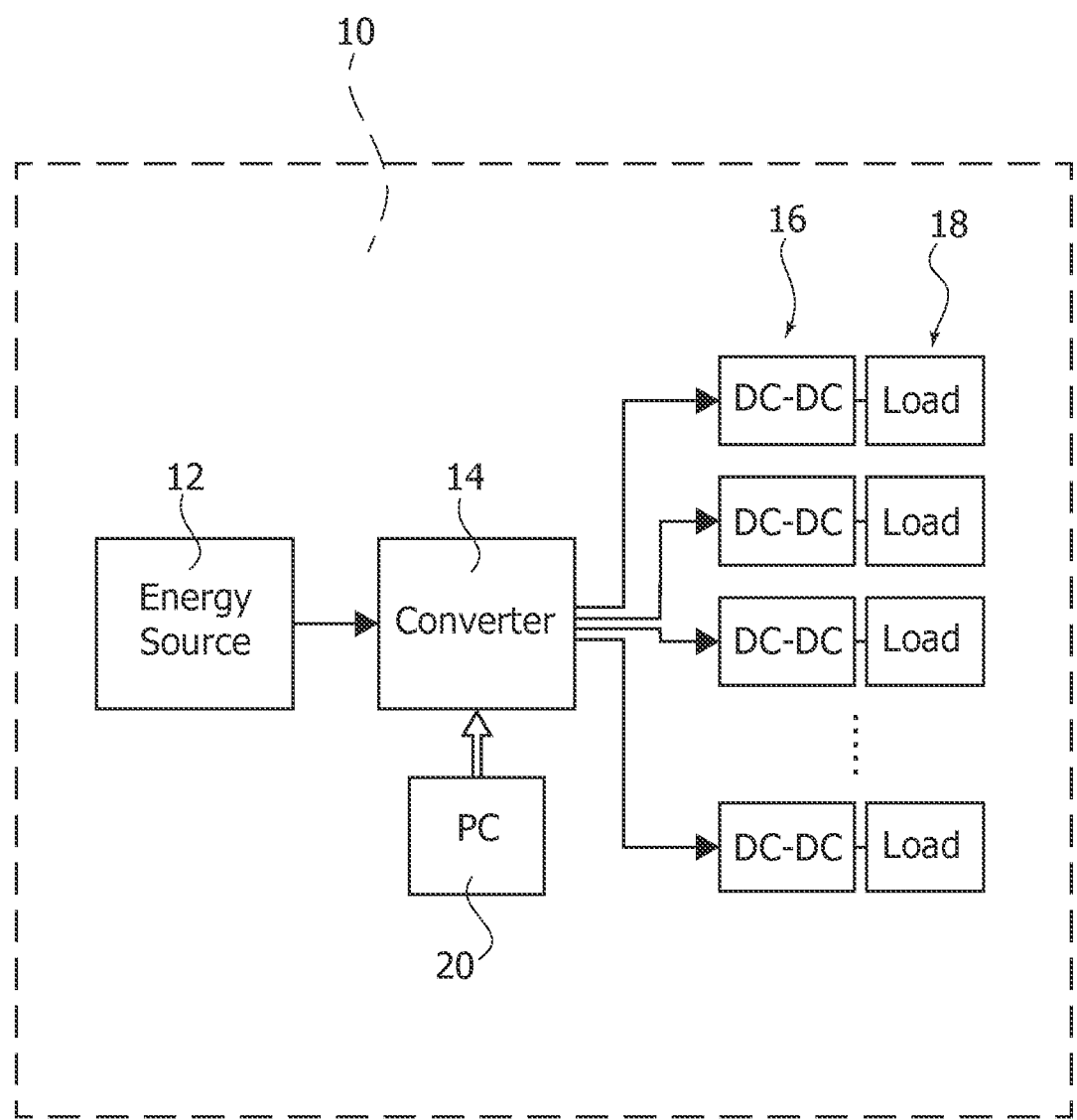
FIG. 1 is a diagram exemplary of a power supply system as per the present disclosure.

As exemplified in FIG. 1, an electronic device 10 is equipped with a power supply management circuit. The electronic device 10 comprises: an energy source 12 (e.g., a battery) configured to store a supply voltage level $V_{IN}$; a bus converter 14 (e.g., a SCC circuit) coupled to the energy source 12 and configured to receive at a supply node or line the supply voltage level $V_{IN}$ therefrom, wherein the bus converter 14 is further configured to provide a regulated voltage level $V_{OUT}$ based on the received supply voltage level, e.g., about 48V; a set of DC-DC converters 16 comprising DC-DC converter circuits (e.g., having a same or different topology) coupled to the bus converter 14 and configured to receive the regulated voltage level $V_{OUT}$ therefrom, wherein the set of DC-DC converters 16 are further coupled to a set of loads 18, where a DC-DC converter in the set of DC-DC converters 16 is coupled to a respective load in the set of loads 18 and configured to provide a regulated voltage level thereto (e.g., three voltage regulators coupled to three loads) and configured to provide regulated voltage levels based on the supply voltage levels respectively received from the bus converter (e.g., about 3.3V, 5V, 12V, respectively); and processing circuitry (PC) 20 coupled to the bus converter 14 and/or the set of DC-DC converters 16 and configured to control operation thereof, for instance by providing control signals $\phi_1$, $\phi_2$ thereto, as discussed in the following.

In particular, the electronic device 10 is a (e.g., battery-operated) portable device (such as a mobile phone or a laptop, for instance), so that efficiency and battery-power management by the DC-DC converter circuitry 14, 16 is relevant for the performance of the device 10.

A power supply system as exemplified herein may comprise: a DC voltage source (for instance, 12) configured to provide a first DC voltage level referred to ground (for instance, GND); a set of converter circuits (for instance, 14, 16) comprising at least one circuit as per the present disclosure; and a control circuit (for instance, 20) coupled to the set of converter circuits to provide control signals (for instance, $\phi_1$, $\phi_2$) thereto; wherein the set of converter circuits is configured to be coupled to a set of respective loads (for instance, $Z_L$, 18) to provide thereto at least one second DC voltage level (for instance, $V_{OUT}$).

An electronic device (for instance, 10) as exemplified herein can be equipped with the power supply system as per the present disclosure.

Thanks to a high and fixed step-down conversion ratio with high efficiency, switched-capacitor converters (SCCs) are suitable for use in the device 10.

Figure 2:
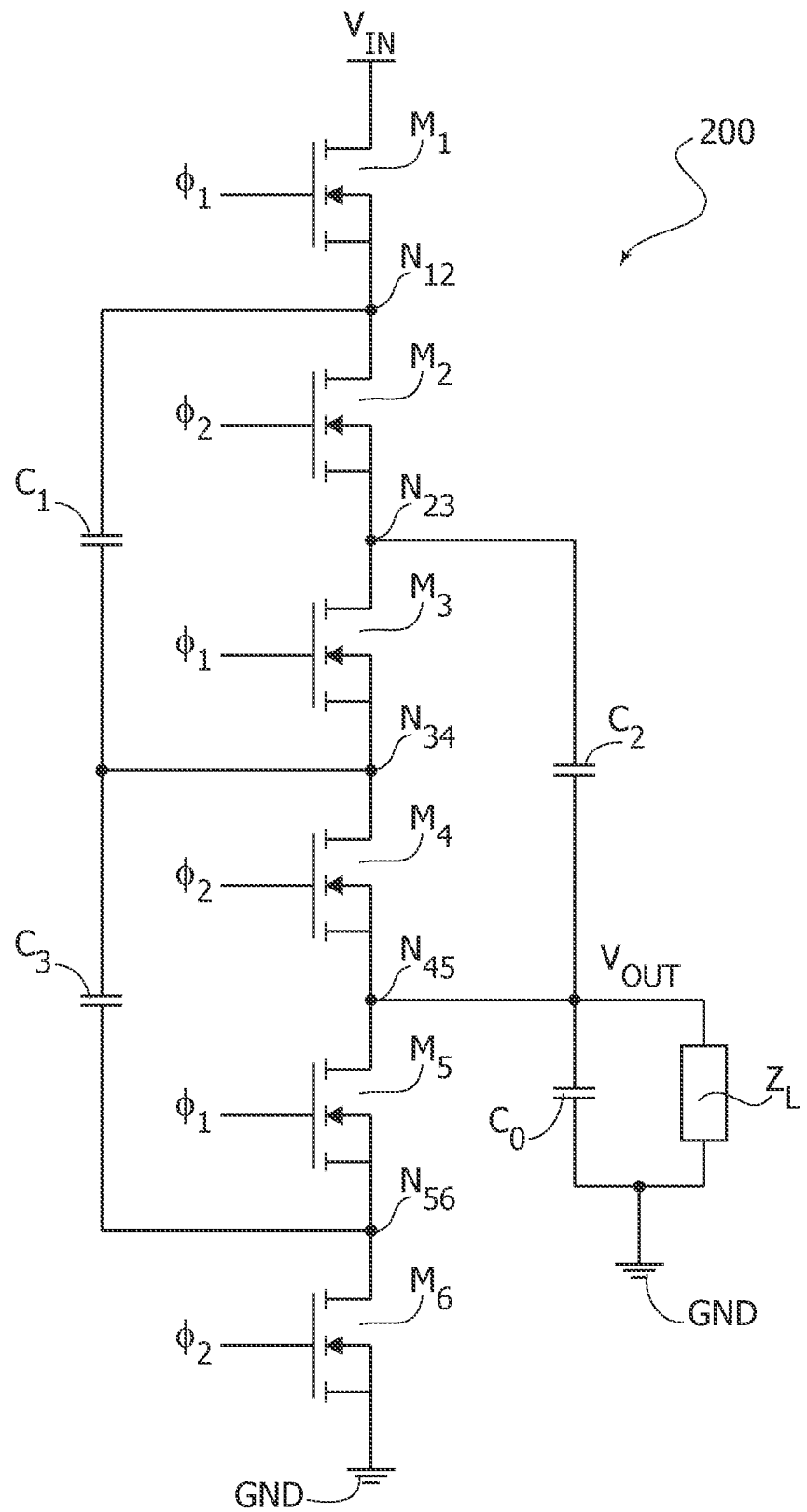
FIG. 2 is a diagram exemplary of a ladder topology of a SCC circuit.

As exemplified in FIG. 2, a SCC circuit 200, in particular having a ladder topology with a conversion ratio of 3-to-1, comprises: an input node $V_{IN}$ configured to receive the voltage level $V_{IN}$ (e.g., from the energy source 10) referred to ground GND; an output node $V_{OUT}$ configured to be coupled to a load impedance $Z_L$ (for instance, the set of DC converters 30) to provide the regulated output voltage $V_{OUT}$ thereto; and a set of (e.g., MOS) transistors $M_1$, $M_2$, $M_3$, $M_4$, $M_5$, $M_6$ each having a respective control node and a respective current path therethrough between a first (e.g., drain) node and a second (e.g., source) node, the set of transistors $M_1$, $M_2$, $M_3$, $M_4$, $M_5$, $M_6$ arranged with respective current paths in series along a current line between the input node $V_{IN}$ and ground GND.

As exemplified in FIG. 2, the set of transistors $M_1$, $M_2$, $M_3$, $M_4$, $M_5$, $M_6$ comprises: a first transistor $M_1$, a third transistor $M_3$ and a fifth transistor $M_5$ configured to receive a first control signal $\phi_1$ (e.g., from the control circuit 20) at respective control nodes, the first $M_1$, third $M_3$ and fifth transistors $M_5$ configured to have respective current paths therethrough made conductive based on the first control signal $\phi_1$ having a first value (e.g., "high" or "1") and made non-conductive based on the first control signal $\phi_1$ having a second value (e.g., "low" or "0"). The set of transistors M1, M2, M3, M4, M5, M6 further comprises: a second transistor $M_2$, a fourth transistor $M_4$ and a sixth transistor $M_6$ configured to receive a second control signal $\phi_2$ (e.g., from the control circuit 20) at respective control nodes, the second $M_2$, fourth $M_4$ and sixth $M_6$ transistors configured to have respective current paths therethrough made conductive based on the second control signal $\phi_2$ having a first value (e.g., "1") and made non-conductive based on the second control signal $\phi_2$ having a second value (e.g., "0").

In one or more embodiments, the control circuit 20 is configured to produce the second $\phi_2$ control signal as an anti-phase version of the first control signal $\phi_1$, that is with a phase difference of $\pi$ or 180° with respect to the first control signal $\phi_1$.

As exemplified in FIG. 2, the SCC circuit 200 further comprises: a first capacitor $C_1$ coupled to the set of transistors $M_1$, $M_2$, $M_3$, $M_4$, $M_5$, $M_6$, the first capacitor $C_1$ having a first capacitor end $N_{12}$ coupled (e.g., directly) intermediate the first transistor $M_1$ and the second transistor $M_2$ and a second capacitor end $N_{34}$ coupled (e.g., directly) intermediate the third transistor $M_3$ and the fourth transistor $M_4$; a second capacitor $C_2$ coupled to the set of transistors $M_1$, $M_2$, $M_3$, $M_4$, $M_5$, $M_6$, the second capacitor $C_2$ having a first capacitor end $N_{23}$ coupled (e.g., directly) intermediate the second transistor $M_2$ and the third transistor $M_3$ and a second capacitor end $N_{45}$ coupled (e.g., directly) at the output node $V_{OUT}$ intermediate the fourth transistor $M_4$ and the fifth transistor $M_5$; a third capacitor $C_3$ coupled to the set of transistors $M_1$, $M_2$, $M_3$, $M_4$, $M_5$, $M_6$, the third capacitor $C_3$ having a first capacitor end $N_{34}$ coupled (e.g., directly) intermediate the third transistor $M_3$ and the fourth transistor $M_4$ and a second capacitor end $N_{56}$ coupled (e.g., directly) intermediate the fifth transistor $M_5$ and the sixth transistor $M_6$; and a filter capacitor $C_0$ having a first capacitor end $N_{45}$ coupled (e.g., directly) to the output node $V_{OUT}$ and a second capacitor end coupled (e.g., directly) to ground GND.

For instance, the first $C_1$, second $C_2$ and third $C_3$ capacitors have a same capacitance, e.g., $C_1 = C_2 = C_3 = C$.

For instance, operating the SCC circuit 200 exemplified in FIG. 2 comprises two operating stages in which the behavior of the circuit 200 varies based on which of the switching transistors $M_1$, $M_2$, $M_3$, $M_4$, $M_5$, $M_6$ is switched to a conductive/non-conductive state.

Figure 2A:
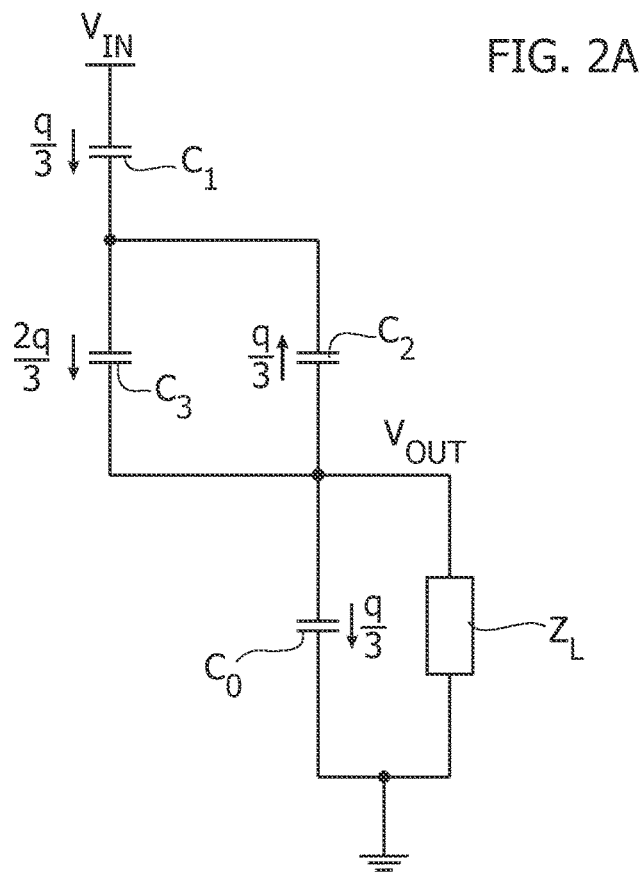
FIGS. 2A and 2B are diagrams exemplary of a method of operating the circuit exemplified in FIG. 2.

As exemplified in FIG. 2A, in a first operating stage, when the first control signal $\phi_1$ has the first value and the second control signal $\phi_2$ has the second value, the first capacitor $C_1$ becomes connected in series with the third capacitor $C_3$, which becomes connected in parallel with the second capacitor $C_2$, which in turn becomes connected in series with the output capacitor $C_0$ between the input node $V_{IN}$ and the output node $V_{OUT}$, so that a current is drawn from the input node $V_{IN}$ to charge up the first capacitor $C_1$ and flows towards the load $Z_L$.

Figure 2B:
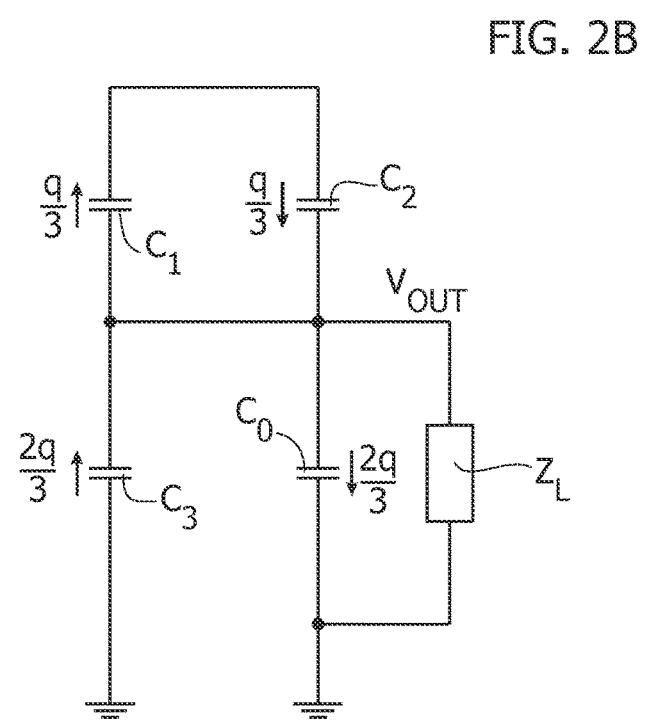

As exemplified in FIG. 2B, in a second operating stage, when the second control signal $\phi_2$ has the first value and the first control signal $\phi_1$ has the second value, the first capacitor $C_1$ becomes connected in series with the third capacitor $C_3$ and in parallel with the second capacitor $C_2$, which in turn becomes connected in series with the output capacitor $C_0$ between output node $V_{OUT}$ and ground GND, so that the charge previously stored on the capacitors is transferred via a current flow towards the load $Z_L$ coupled at the output node $V_{OUT}$.

As exemplified in FIGS. 2A and 2B, charge flow with respect to a total output charge q in each of the two operating stages is represented with arrows, e.g., directed towards a "top" of the page to indicate charging of the capacitor and directed towards a "bottom" of the page to indicate discharging of the capacitor.

For instance, in order to maintain charge balance in each capacitor $C_1$, $C_2$, $C_3$, $C_0$ of the circuit 200, a total charge q injected in the circuit from input node $V_{IN}$ is equal to a fraction, e.g., ⅓, of the total output charge. As a result, considering an ideal case without any dissipative element present in the circuit 200, an output power equals an input power, resulting in the output voltage $V_{OUT}$ being a fraction of the input voltage, e.g., $V_{OUT} = V_{IN}/3$.

For the sake of simplicity, principles underlying one or more embodiments are discussed in the following mainly with respect to a SCC converter circuit with a 3-to-1 ladder topology, being otherwise understood that such a topology is purely exemplary and in no-way limiting.

For instance, virtually any N-to-1 converter circuit (with integer N above or equal to 2) with a conventional ladder topology may be assembled providing twice an amount of N transistors in the set of transistors $M_1$, $M_2$, $M_3$, $M_4$, $M_5$, $M_6$ and an amount of N (for instance, equally capacitive) capacitors $C_1$, $C_2$, $C_3$, coupling a first end of the i-th capacitor Ci intermediate the i-th transistor and the i+1-th transistor and a second end of the i-th capacitor Ci intermediate an i+2-th transistor and an i+3-th transistor.

As appreciable to those of skill in the art, any SCC topology with any N-to-m voltage converter ratio (including the SCC circuit with a 3-to-1 converter ratio of FIG. 2) can be modeled like an ideal DC-DC transformer between the input node $V_{IN}$ and the output node $V_{OUT}$ with a series resistor $R_{OUT}$ on the secondary side of the ideal transformer, where the resistor $R_{OUT}$ represents an output voltage drop with respect to the nominal output voltage $V_{OUT}$ and losses due to conduction and charging/discharging the converter 200.

Figure 3:
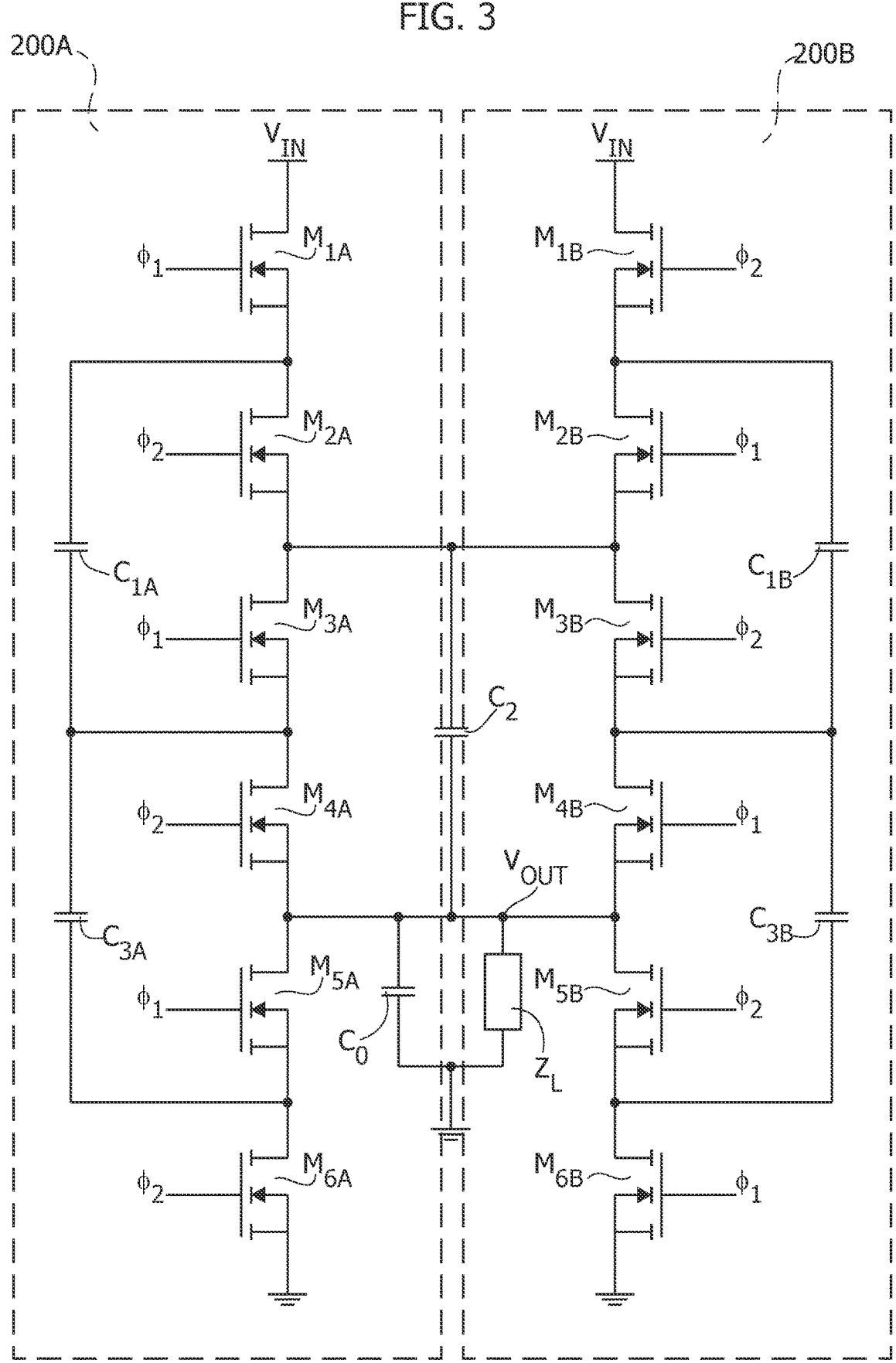
FIG. 3 is a diagram exemplary of an interleaved topology of a converter circuit.

As exemplified in FIG. 3, the SCC circuit may present an interleaved ladder topology obtained using a method of interleaving comprising the steps of: providing a first SCC circuit branch 200A, e.g., a ladder topology with 3-to-1 conversion ratio; producing at least one specular symmetric replica 200B of the SCC circuit 200A, for instance a second circuit branch 200B as exemplified in FIG. 3; coupling the input nodes $V_{IN}$ and the output nodes $V_{OUT}$ of the second circuit branch 200B replicating the first circuit branch 200A to the same nodes of the provided first circuit branch 200A; and driving the control nodes of transistors $M_{1B}$, $M_{2B}$, $M_{3B}$, $M_{4B}$, $M_{5B}$, $M_{6B}$ in the second circuit branch 200B with the opposite control signal with respect to that which is used to drive the mirror-symmetrical transistors $M_{1A}$, $M_{2A}$, $M_{3A}$, $M_{4A}$, $M_{5A}$, $M_{6A}$ of the "original" circuit branch 200A.

For instance, interleaving facilitates reduction in the output voltage ripple, exploiting a number of K parallel replicas of the branch 200A including a respective set of switching transistors $M_1$, $M_2$, $M_3$, $M_4$, $M_5$, $M_6$, each branch operated by control signals $\phi_1$, $\phi_2$ having a relative phase-shift therebetween, e.g., about 360°/K or 2n/K where K is the number of circuit branches 200A, 200B in the converter circuit, which can be notionally equal to any integer positive value.

It is noted that interleaving, while increasing the number of electronic components in the converter circuit, does not lead automatically to an increase of area footprint, as the components in each branch can be reduced in size with respect to a "single-branch" implementation of the converter. This is due to the transistors and the capacitors of the two "legs" of the interleaved converter being designed to manage half of the total output power with respect to the "single branch" implementation (see, e.g., FIG. 2).

As exemplified in FIG. 3, the second capacitor $C_2$ is shared between the first 200A and second 200B circuit portions.

As mentioned, a ladder N-to-1 circuit topologies comprises a number of transistors or switches and a number of capacitors that increases with the order N of conversion, for instance according to the following Table I.

| N | No. of switches | No. of capacitors |
|---|---|---|
| 2 | 4 | 1 |
| 3 | 6 | 3 |
| 4 | 8 | 5 |
| 5 | 10 | 7 |

The Inventors have observed that in the circuit as exemplified in FIG. 3, a net charge coming from the first circuit portion 200A equals a net charge entering the replica circuit portion 200B, so that a zero net charge goes in $C_2$. At the same time, the second capacitor $C_2$ works as a bypass capacitor which can hardly be dispensed with. For instance, despite its limited functionality, size of the second capacitor $C_2$ may be dominant in making the circuit as exemplified in FIG. 3.

Figure 4:
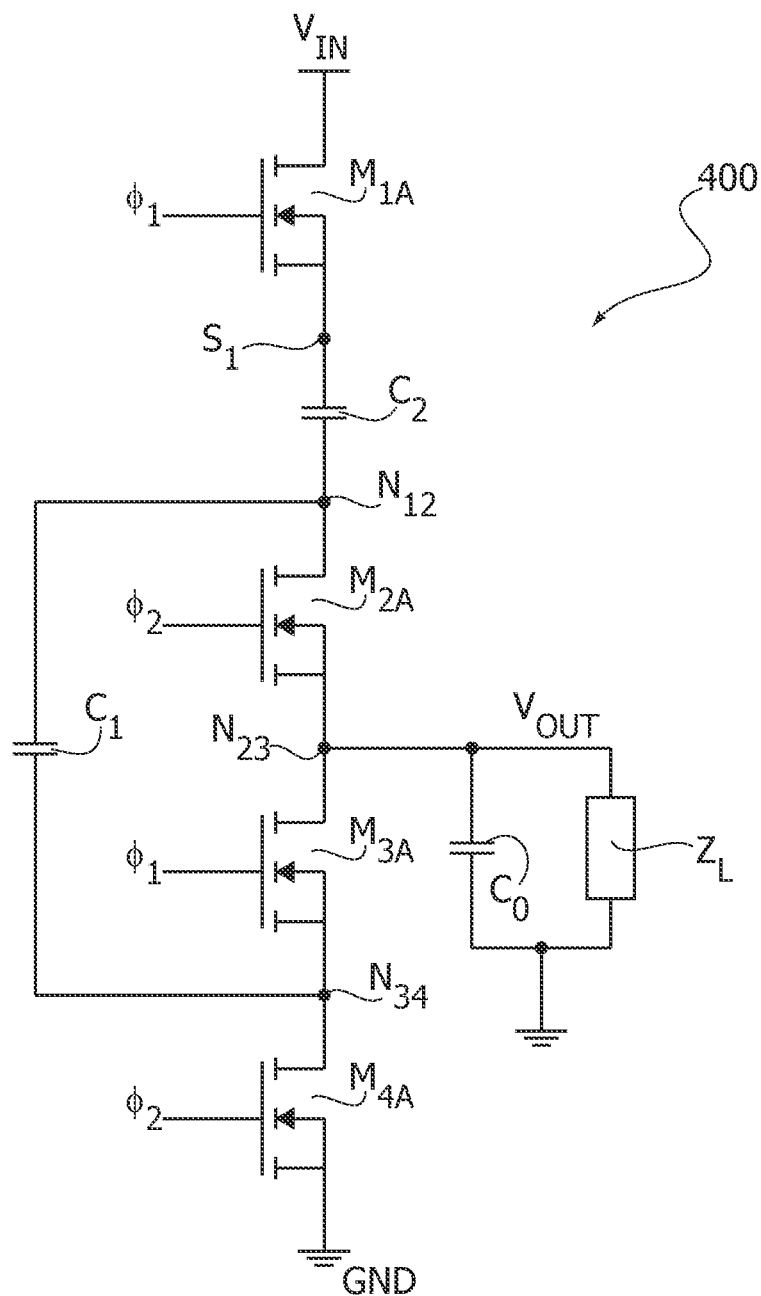
FIG. 4 is a diagram exemplary of a topology of a SCC circuit as per the present disclosure.

As exemplified in FIG. 4, an alternative 3-to-1 SCC converter circuit topology 400 comprises: an input node $V_{IN}$ configured to receive the voltage level $V_{IN}$ (e.g., from the energy source 12); an output node $V_{OUT}$ configured to be coupled to a load impedance $Z_L$ (for instance, the set of DC converters 16) to provide the regulated output voltage $V_{OUT}$ thereto; and a reduced set of transistors $M_{1A}$, $M_{2A}$, $M_{3A}$, $M_{4A}$ each having a respective control node and a respective current path therethrough between a drain node and a source node, the reduced set of transistors $M_{1A}$, $M_{2A}$, $M_{3A}$, $M_{4A}$ being arranged with the respective current paths in series along a current line between the input node $V_{IN}$ and ground GND.

The reduced set of transistors $M_{1A}$, $M_{2A}$, $M_{3A}$, $M_{4A}$ comprises: a first transistor $M_{1A}$ and a third transistor $M_{3A}$ configured to receive a first control signal $\phi_1$ (e.g., from the control circuit 20) at respective control nodes, the first $M_{1A}$ and third $M_{3A}$ transistors configured to have respective current paths therethrough made conductive based on the first control signal $\phi_1$ having a first value (e.g., "high" or "1") and made non-conductive based on the first control signal $\phi_1$ having a second value (e.g., "low" or "0"); and a second transistor $M_{2A}$ and a fourth transistor $M_{4A}$ configured to receive a second control signal $\phi_2$ (e.g., from the control circuit 20) at respective control nodes, the second $M_2$ and fourth $M_4$ transistors configured to have respective current paths therethrough made conductive based on the second control signal $\phi_2$ (which is in antiphase with the first signal $\phi_1$) having a first value (e.g., "high" or "1") and made non-conductive based on the second control signal $\phi_2$ having a second value (e.g., "low" or "0").

As exemplified in FIG. 4, the circuit 400 further comprises: a first capacitor $C_1$ coupled to the set of transistors $M_{1A}$, $M_{2A}$, $M_{3A}$, $M_{4A}$, the first capacitor $C_1$ having a first capacitor end $N_{12}$ coupled (e.g., directly) to the drain of the second transistor $M_2$ and a second capacitor end $N_{34}$ coupled (e.g., directly) intermediate the third transistor $M_3$ and the fourth transistor $M_4$; a second capacitor $C_{2A}$ coupled to the reduced set of transistors $M_{1A}$, $M_{2A}$, $M_{3A}$, $M_{4A}$, the second capacitor $C_{2A}$ having a first capacitor end Si coupled (e.g., directly) to the source (or drain) node of the first transistor $M_{1A}$ and a second capacitor end $N_{12}$ coupled (e.g., directly) to the drain (or source) of the second transistor $M_2$; and a filter capacitor $C_0$ having a first capacitor end $N_{23}$ coupled (e.g., directly) to the output node $V_{OUT}$ and a second capacitor end coupled (e.g., directly) to ground GND.

For instance, the first $C_{1A}$, second $C_{2A}$ and filter $C_0$ capacitors have a same capacitance, e.g., $C_{1A}=C_{2A}=C_0=C$.

As exemplified in FIG. 4, during a first phase in which, for instance, the first signal $\phi_1$ is at the first value (e.g., $\phi_1$="1"), both the first capacitor $C_1$ and the output capacitor $C_0$ are charged so that the output voltage $V_{OUT}$ is a (third) fraction of the input voltage $V_{IN}$ (e.g., $V_{OUT}=V_{IN}/3$). At the same time, no charge can be transferred from the input node $V_{IN}$ to the output node $V_{OUT}$ of the circuit 400 because the second capacitor $C_{2A}$ interposed the first $M_{1A}$ and second $M_{2A}$ transistors cannot be charged.

Figure 5:
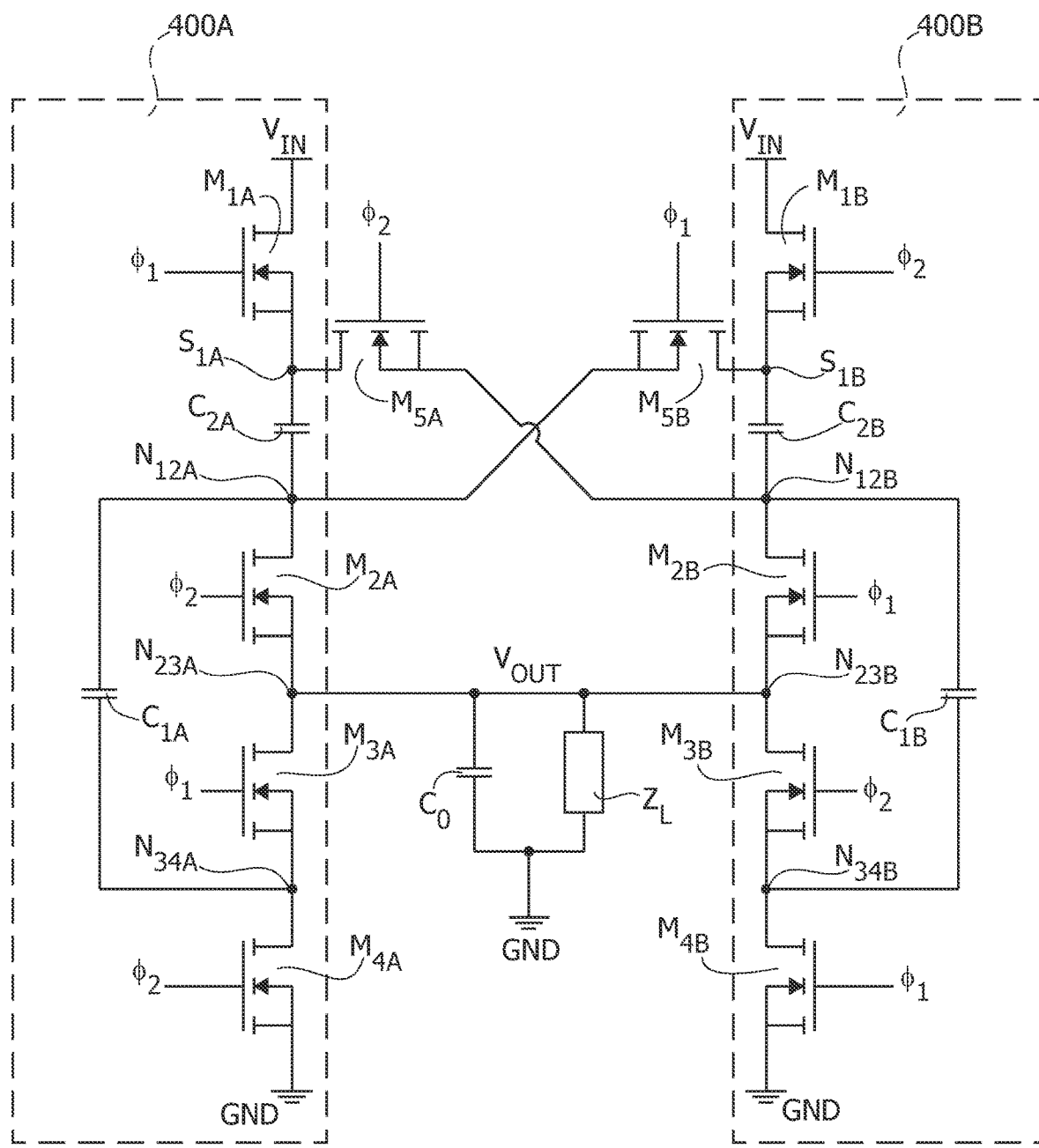
FIG. 5 is a diagram exemplary of an alternative topology of a SCC circuit as per the present disclosure.

As exemplified in FIG. 5, an alternative, interleaved, 3-to-1 SCC converter, suitable for use in the device 10 of FIG. 1, can facilitate providing a charge transfer from input node $V_{IN}$ to output node $V_{OUT}$.

As exemplified in FIG. 5, the interleaved 3-to-1 SCC converter circuit comprises: a first "left" circuit branch 400A which is substantially equal to the circuit 400 exemplified in FIG. 4; and a second "right" circuit branch 400B which comprises a mirror-symmetrical replica of the circuit arrangement in the "left" branch 400A, where transistors $M_{1B}$, $M_{2B}$, $M_{3B}$, $M_{4B}$ are controlled with respect to the "twin" transistors $M_{1A}$, $M_{2A}$, $M_{3A}$, $M_{4A}$.

Specifically, in the example considered, the control nodes of transistors $M_{1B}$, $M_{2B}$, $M_{3B}$, $M_{4B}$ in the second circuit branch 400B are configured to be driven by an opposite control signal with respect to that which drives the mirror-symmetrical transistors $M_{1A}$, $M_{2A}$, $M_{3A}$, $M_{4A}$ of the "original", first circuit branch 400A.

As exemplified in FIG. 5, the first branch 400A and the second branch 400B are coupled therebetween: at the nodes intermediate the respective second $M_{2A}$, $M_{2B}$ and third $M_{3A}$, $M_{3B}$ transistors which are further coupled to the output capacitor $C_0$ configured to provide the output voltage Vout at the load $Z_L$ coupled thereto; and via a first inter-branch transistor $M_{5A}$ having a control node and a current path therethrough between a drain node and a source node, where a first (e.g., source) node $S_{1A}$ of the first coupling transistor $M_{5A}$ is coupled intermediate the first end $S_{1A}$ of the second capacitor $C_{2A}$ in the first circuit branch 400A, where a second (e.g., drain) node $N_{12B}$ of the first inter-branch transistor $M_{5A}$ is coupled intermediate the first end $N_{12B}$ of the second capacitor $C_{2B}$ in the second circuit branch 400B, the current path of the first inter-branch transistor $M_{5A}$ configured to be made selectively conductive and non-conductive based on a control signal $\phi_2$ opposite the control signal $\phi_1$ at the control node of the first transistor $M_{1A}$ in the first circuit branch 400A; and via a second inter-branch transistor $M_{5B}$ having a control node and a current path therethrough between a respective drain node and a source node, where a first (e.g., drain) node $S_{1B}$ of the second inter-branch transistor $M_{5B}$ is coupled intermediate the first end $S_{1B}$ of the second capacitor $C_{2B}$ in the second circuit branch 400B, where a second (e.g., source) node $N_{12A}$ of the second coupling transistor $M_{5B}$ is coupled intermediate the first end $N_{12A}$ of the second capacitor $C_{2A}$ in the first circuit branch 400A, the current path of the second inter-branch transistor $M_{5B}$ configured to be made selectively conductive and non-conductive based on a control signal $\phi_1$ opposite the control signal $\phi_2$ at the control node of the first transistor $M_{1B}$ in the second circuit branch 400B.

Figure 5A:
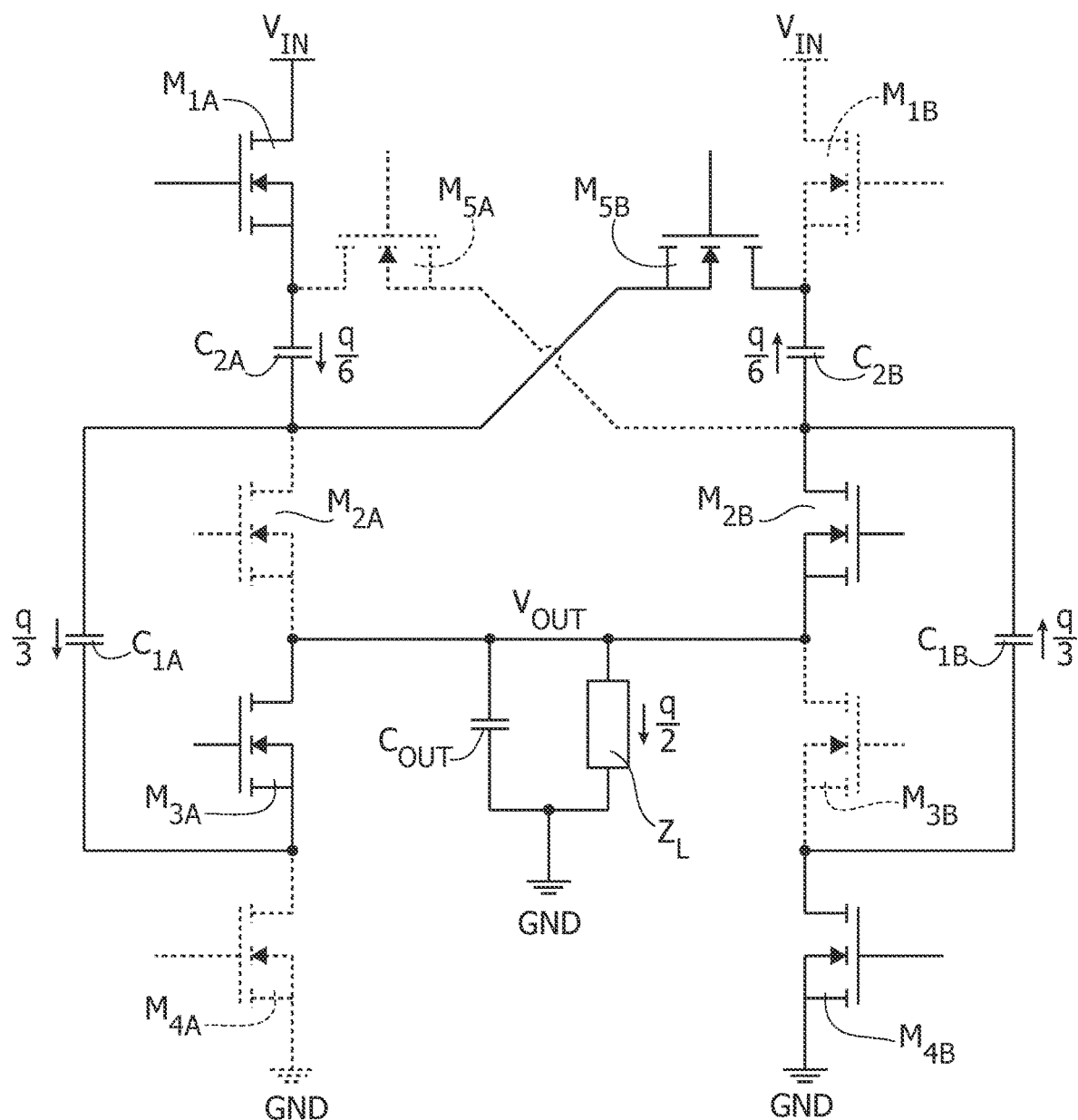
FIGS. 5A and 5B are diagrams exemplary of a method of operating the circuit exemplified in FIG. 5.

As exemplified in FIG. 5A, when the first control signal $\phi_1$ has the first value (e.g., $\phi_1$="1") and the second control signal $\phi_2$ has the second value (e.g., $\phi_2$="0"), the first capacitor $C_{1A}$ in the first branch 400A becomes connected in series with the second capacitor $C_{2A}$ in the first branch 400A and with the output capacitor $C_O$ between the output node $V_{out}$ and ground GND, while the first capacitor $C_{1B}$ in the second branch 400B becomes connected in series with the second capacitor $C_{2B}$ in the second branch 400B, which in turn becomes connected in parallel to the first capacitor $C_{1A}$ in the first branch 400A so that a current is drawn from the input node $V_{IN}$ and flows towards load $Z_L$.

Figure 5B:
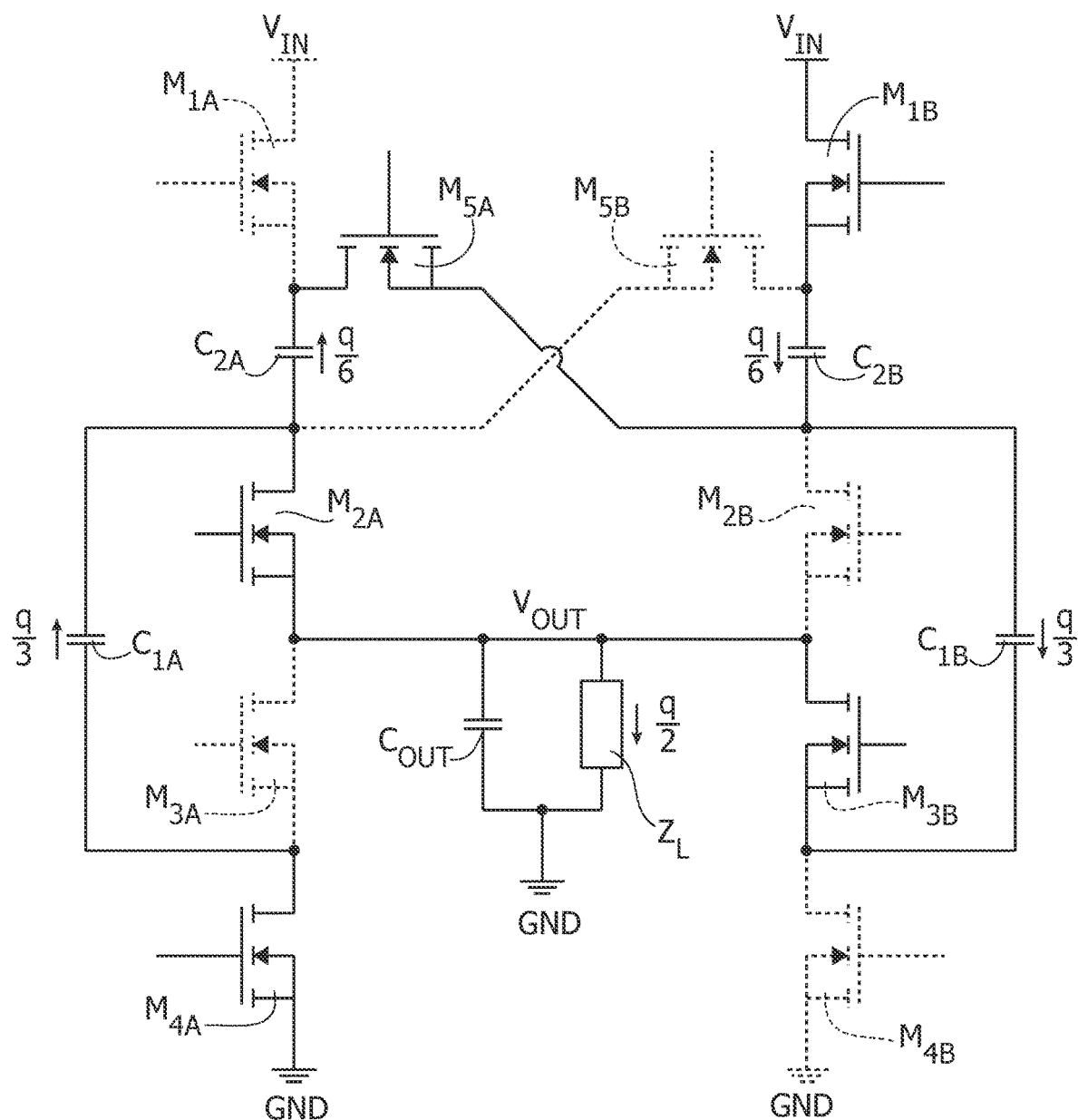

As exemplified in FIG. 5B, when the second control signal $\phi_2$ has the first value (e.g., $\phi_2$="1") and the first control signal $\phi_1$ has the second value (e.g., $\phi_1$="0"), the first capacitor $C_{1B}$ in the second branch 400B becomes connected in series with the second capacitor $C_{2B}$ in the second branch 400B and with the output capacitor $C_O$ between the input node $V_{IN}$ and the output node $V_{OUT}$, while the first capacitor $C_{1A}$ in the first branch 400A becomes connected in series with the second capacitor $C_{2A}$ in the first branch 400A, which in turn becomes connected in parallel to the first capacitor $C_{1B}$ in the second branch 400B so that a current is drawn from the input node $V_{IN}$ and flows towards load $Z_L$.

A circuit arrangement as exemplified in FIG. 5 with respect to the arrangement as exemplified in FIG. 3 counters the use of the bypass capacitor (e.g., $C_2$ in FIG. 3) and has a reduced number of transistors per branch. In particular, the circuit as exemplified in FIG. 5 facilitates to obtain a 3-to-1 voltage conversion factor with only a pair of capacitors $C_{1A}$, $C_{2A}$ per circuit branch 400A, 400B and four transistors $M_{1A}$, $M_{2A}$, $M_{3A}$, $M_{4A}$ (plus the inter-branch one $M_{5A}$) per branch 400A, 400B.

For instance, the first $C_{1A}$, $C_{1B}$ second $C_{2A}$, $C_{2B}$, and filter $C_O$ capacitors have a same capacitance, e.g., $C_{1A}=C_{2A}=C_{1B}=C_{2B}=C_O=C$.

It is noted that the discussion in the foregoing with respect to the alternative SCC circuit with conversion ratio 3-to-1 can be extended to virtually any SCC circuit with any integer N-to-1 conversion ratio, with integer N>=3.

A circuit as exemplified herein can comprise: an input node (for instance, $V_{IN}$) configured to be coupled to a DC voltage source to receive therefrom a first DC voltage level (for instance, $V_{IN}$) referred to ground; and a first circuit branch (for instance, 400A) and a second circuit branch (for instance, 400B) between the input node and ground. Each of the first and the second circuit branches comprises: a first transistor (for instance, $M_{1A}$, $M_{1B}$), a second transistor (for instance, $M_{2A}$, $M_{2B}$), a third transistor (for instance, $M_{3A}$, $M_{3B}$), and a fourth transistor (for instance, $M_{4A}$, $M_{4B}$) arranged with the current flow paths therethrough cascaded between the input node and ground, with an output node (for instance, $V_{OUT}$) configured to be coupled to a load (for instance, $Z_L$) intermediate the second transistor and the third transistor to provide thereto a second DC voltage level. The circuit further comprises a capacitor (for instance, $C_{1A}$, $C_{1B}$) arranged in parallel to the second transistor and the third transistor.

For instance: in the first circuit branch, the first transistor (for instance, $M_{1A}$) and the third transistor (for instance, $M_{3A}$) have control nodes configured to receive a first control signal (for instance, $\phi_1$) and are configured to be made conductive and non-conductive based on the first control signal having a first or a second value of the first control signal and the second transistor (for instance, $M_{2A}$) and the fourth transistor (for instance, $M_{4A}$) have control nodes configured to receive a second control signal (for instance, $\phi_2$) in antiphase to the first control signal and are configured to be made conductive and non-conductive based on the second control signal having a first or a second value of the second control signal. Furthermore, in the second circuit branch (for instance, 400B), the first transistor (for instance, $M_{1B}$) and the third transistor (for instance, $M_{3B}$) have control nodes configured to receive the second control signal and are configured to be made conductive and non-conductive based on the second control signal having said first or said second value of the second control signal and the second transistor (for instance, $M_{2B}$) and the fourth transistor (for instance, $M_{4B}$) have control nodes configured to receive the first control signal and are configured to be made conductive and non-conductive based on the first control signal having said first or said second value of the first control signal.

The circuit further comprises at least one inter-branch circuit block (for instance, 70; 70A, 70B), wherein the at least one inter-branch circuit block comprises: a first capacitor (for instance, $C_{2A}$) coupled between a first capacitor node (for instance, $S_{1A}$) and a second capacitor node (for instance, $N_{12A}$) intermediate the first transistor and the second transistor in the first circuit branch; a second capacitor (for instance, $C_{2B}$) coupled between a third capacitor node (for instance, $S_{1B}$) and a fourth capacitor node (for instance, $N_{12B}$) intermediate the first transistor and the second transistor in the second circuit branch; a first inter-branch transistor (for instance, $M_{5A}$) having a control node configured to receive the second control signal and a current path therethrough between the first capacitor node in the first circuit branch and the fourth capacitor node in the second circuit branch; and a second inter-branch transistor having a control node configured to receive the first control signal and a current path therethrough between the third capacitor node in the second circuit branch and the second capacitor node in the first circuit branch.

Figure 6:
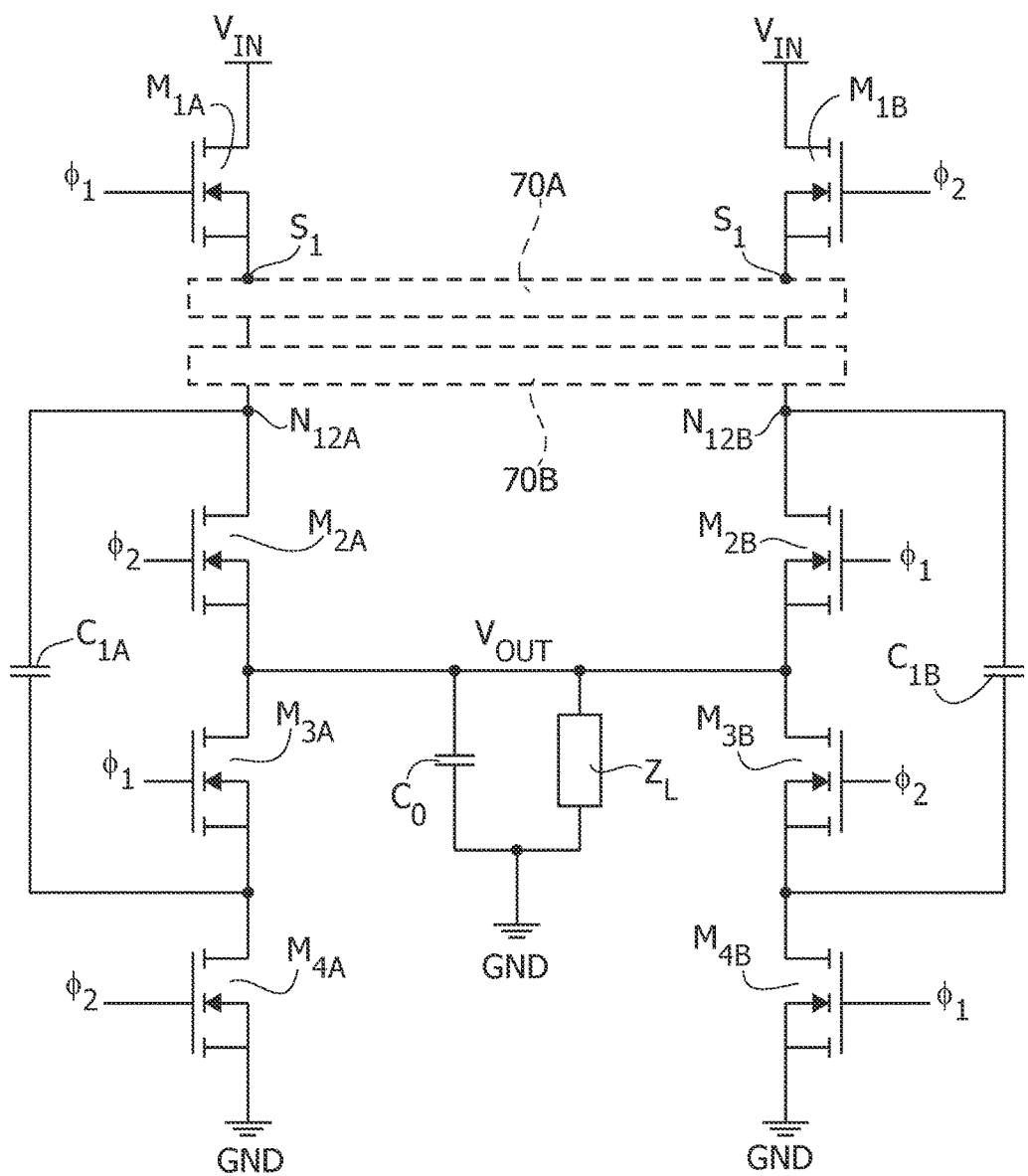
FIG. 6 is a diagram exemplary of alternative topologies of a converter circuit as per the present disclosure.

As exemplified in FIG. 6, a core portion of the converter circuit comprises transistors in the two branches 400A, 400B and the first capacitors $C_{1A}$, $C_{1B}$ "bypassing" transistors $M_{2A}$, $M_{3A}$, while the portion of the circuit branches 400A, 400B coupled between the first or second node $S_{1A}$, $S_{1B}$ of the first transistors $M_{1A}$, $M_{1B}$ and the first ends $N_{12A}$, $N_{12B}$ of the first capacitors $C_{1A}$, $C_{1B}$ in respective circuit branches 400A, 400B, comprises a stack of cascaded circuit blocks 70A, 70B, where the number of circuit blocks stacked determines the conversion ratio m-to-1.

Figure 7:
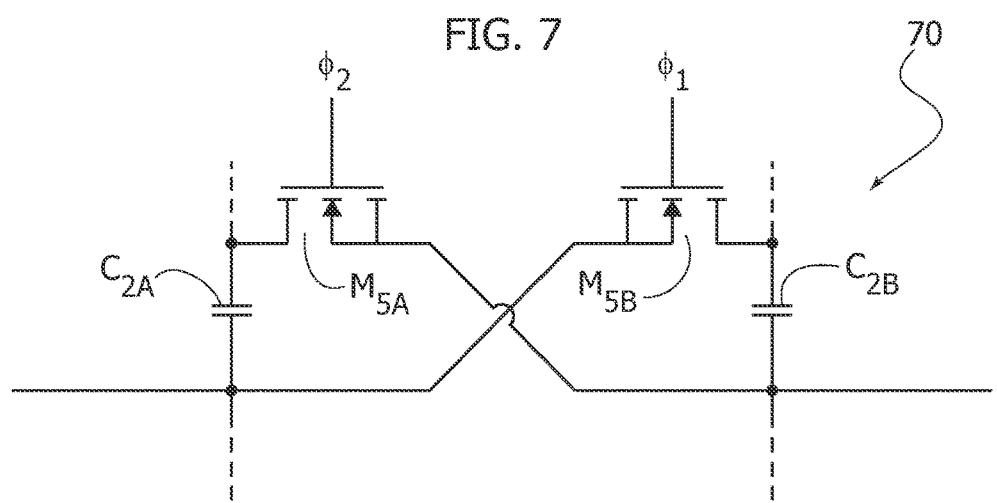
FIG. 7 is a diagram exemplary of a portion of the circuit exemplified in FIG. 6.

As exemplified in FIG. 7, a circuit block 70 suitable to be cascaded to other circuit blocks in the exemplary circuit of FIG. 6 comprises the pair of capacitors $C_{2A}$, $C_{2B}$ and a pair of inter-branch transistors $M_{5A}$, $M_{5B}$ (see the discussion in the foregoing with respect to FIG. 5).

For instance, coupling a single circuit block 70 to the core circuit exemplified in FIG. 6 provides a SCC circuit as exemplified in FIG. 5 having a first conversion ratio (e.g., m=3). Furthermore, coupling a cascade of two circuit blocks 70A, 70B to the core circuit exemplified in FIG. 6 provides a SCC circuit having a second conversion ratio (e.g., m=4). Additionally, coupling a triplet of circuit blocks 70 to the core circuit exemplified in FIG. 6 provides a SCC circuit having a third conversion ratio (e.g., m=5). The foregoing can be repeated so that coupling j+1 circuit blocks 70 with j>=0 to the core circuit exemplified in FIG. 6 provides a SCC circuit having a conversion ratio m=3+j.

With respect to conventional solutions, an arrangement as exemplified in FIG. 6, with notionally any number of circuit blocks 70 cascaded therein, can provide a SCC circuit with virtually any conversion ratio N-to-1 using (capacitive and switching) components with a (maximum) voltage rating equal to $V_{OUT}$ for the branch-elements and equal to $2V_{out}$ for the inter-branch elements.

The circuit as exemplified herein can comprise a plurality of the inter-branch circuit blocks (for instance, 70A, 70B) in a cascaded arrangement between the first transistors and the second transistors in the first and second circuit branches. Each inter-branch circuit block (for instance, 70) in the plurality of said inter-branch circuit blocks comprises: a first capacitor (for instance, $C_{2A}$) coupled between a first capacitor node (for instance, $S_{1A}$) and a second capacitor node (for instance, $N_{12A}$) intermediate the first transistor and the second transistor in the first circuit branch; a second capacitor (for instance, $C_{2B}$) coupled between a third capacitor node (for instance, $S_{1B}$) and a fourth capacitor node (for instance, $N_{12B}$) intermediate the first transistor and the second transistor in the second circuit branch; a first inter-branch transistor (for instance, $M_{5A}$) having a control node configured to receive the second control signal and a current path therethrough between the first capacitor node in the first circuit branch and the fourth capacitor node in the second circuit branch; and a second inter-branch transistor (for instance, $M_{5B}$) having a control node configured to receive the first control signal and a current path therethrough between the third capacitor node in the second circuit branch and the second capacitor node in the first circuit branch.

A method of operating the circuit as per the present disclosure may comprise: providing a first control signal (for instance, $\phi_1$) to the control node of the first and third transistors in the first branch, to the respective first and third transistors in the second branch and to the second transistor in each inter-branch circuit block; and providing a second control signal (for instance, $\phi_2$) as an antiphase version of the first signal to the control node of the second and fourth transistors in the first branch, to the respective second and fourth transistors in the second branch and to the first inter-branch transistor in each inter-branch circuit block.

The circuit as exemplified herein can comprise a number j+1 of said inter-branch circuit blocks, with j>=0, wherein the second DC voltage level is an integer fraction 1/N of the first DC voltage level, with N=3+j.

In the circuit as exemplified herein, the capacitors in each of the first and second circuit branches have a same capacitance.

In the circuit as exemplified herein, the first capacitor and the second capacitor in the at least one inter-branch circuit block have a same capacitance.

It is noted that a fair comparison can be performed between topologies which provides a same conversion ratio.

As discussed in the foregoing, any SCC circuit can be modeled as an equivalent transformer circuit configured to receive the input voltage at the primary side and having a output resistance $R_{OUT}(f)$ on the secondary side.

Based on this model, a pair of figures of merit can be defined for SCC circuits, for instance: a slow switching limit (SSL), configured to describe the properties of the circuit at low frequency (dominant charging/discharging losses); and a fast switching limit (FSL) configured to describe the properties of the circuit at high frequency (dominant conduction losses).

In a manner per se known to those of skill in the art, an equivalent resistance can be defined for each of these two parameters, which can be expressed as:

$$R_{SSL} = -\frac{v_{out}}{i_{out}} = \sum_i \frac{(a_{c,i})^2}{C_i f_{sw}}$$

$$R_{FSL} = 2\sum_i R_i (a_{r,i})^2$$

Where: $C_i$ is the capacitance value of the i-th capacitor, $R_i$ is the on-state resistance of the i-th transistor, $a_{c,i}$ is a vector synthetizing the charge flow in the capacitors, and $a_{r,i}$ is a vector synthetizing the charge flow in the transistors.

Alternatively, the same quantities can be expressed as:

$$R_{SSL} = \frac{1}{C_{TOT} f_{SW}} \left(\sum_i |a_{c,i}|\right)^2$$

$$R_{FSL} = \frac{2}{G_{TOT}} \left(\sum_i |a_{r,i}|\right)^2$$

Where: $C_{TOT}$ is a global converter capacitance $C_{TOT}$, $G_{TOT}$ is a global converter conductance $G_{TOT}$, and where both $C_{TOT}$ and $G_{TOT}$ are (directly) proportional to the area occupancy of the SCC circuit.

As a result, the SSL and FSl coefficients can be expressed as:

$$SSL = \left(\sum_i |a_{c,i}|\right)^2$$

$$FSL = \left(\sum_i |a_{r,i}|\right)^2$$

For instance, the lower SSL or FSL (which vary with the selected circuit topology), the smaller $C_{TOT}$ or $G_{TOT}$ providing a same $R_{OUT}$ value.

In one or more embodiments, irrespective of the technology of the electronic components (e.g., discrete or integrated), an area benefit can be maximized thanks to using a minimum absolute number of transistors and capacitors, facilitating reaching a minimum FSL coefficient.

A comparison of the performance of a 3-to-1 converter circuit and a 4-to-1 converter circuit in various topologies, including the ones as per the present disclosure, is summarized in the Table II below, showing numerical examples indicative of the performance improvements discussed in the foregoing.

| Topology | SSL | FSL | No. switches | No. capacitors |
|---|---|---|---|---|
| Ladder Interleaved | 1 | 7.11 | 12 | 4 (+1 BP) |
| FIG. 3 | 1 | 5.44 | 10 | 4 |
| Ladder Interleaved | 2.25 | 6.25 | 16 | 6 (+2 BP) |
| Stacked Ladder Interleaved | 0.56 | 9 | 16 | 6 (+2 BP) |

| Topology | SSL | FSL | No. switches | No. capacitors |
|---|---|---|---|---|
| Dickson Interleaved | 0.56 | 6.25 | 16 | 6 |
| FIG. 6 | 2.25 | 6.25 | 12 | 6 |

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A circuit, comprising:
a first circuit branch coupled between a DC input node and a reference node, wherein said first circuit branch comprises:
a first transistor coupled between the DC input node and a first capacitor node;
a first capacitor coupled in series with the first transistor between the first capacitor node and a second capacitor node; and
a second transistor coupled in series with the first capacitor between the second capacitor node and an output node;
wherein the first and second transistors are gate controlled by first and second signals, respectively, that are 180° out of phase with each other;
a second circuit branch coupled between the DC input node and the reference node, wherein said second circuit branch comprises:
a third transistor coupled between the DC input node and a third capacitor node;
a second capacitor coupled in series with the third transistor between the third capacitor node and a fourth capacitor node; and
a fourth transistor coupled in series with the second capacitor between the fourth capacitor node and the output node;
wherein the third and fourth transistors are gate controlled by the second and first signals, respectively;
a fifth transistor that is gate controlled by the second signal and coupled between the first capacitor node and the fourth capacitor node; and
a sixth transistor that is gate controlled by the first signal and coupled between the second capacitor node and the third capacitor node.

2. The circuit of claim 1:
wherein the first circuit branch further comprises:
a seventh transistor that is gate controlled by the first signal and coupled in series with the second transistor between the output node and a fifth capacitor node; and
a third capacitor coupled between the second capacitor node and the fifth capacitor node; and
wherein the second circuit branch further comprises:

an eighth transistor that is gate controlled by the second signal and coupled in series with the fourth transistor between the output node and a sixth capacitor node; and
a fourth capacitor coupled between the fourth capacitor node and the sixth capacitor node.

3. The circuit of claim 2:
wherein the first circuit branch further comprises a ninth transistor that is gate controlled by the second signal and coupled in series with the seventh transistor between the fifth capacitor node and the reference node; and
wherein the second circuit branch further comprises a tenth transistor that is gate controlled by the first signal and coupled in series with the sixth transistor between the sixth capacitor node and the reference node.

4. A power supply system, comprising:
a DC voltage supply coupled to the DC input node and reference node;
a converter circuit formed by at least one circuit according to claim 1;
a control circuit coupled to the converter circuit to provide said first and second signals;
wherein the output node is configured to be coupled to a respective load to provide thereto a DC voltage level.

5. An electronic device equipped with the power supply system of claim 4.

6. The electronic device of claim 5, wherein said DC voltage supply is a battery and the electronic device is a portable electronic device.

7. A circuit, comprising:
an input node configured to be coupled to a DC voltage source to receive therefrom a first DC voltage level referred to ground;
a first circuit branch and a second circuit branch between the input node and ground, wherein each of the first circuit branch and the second circuit branch comprises:
a first transistor, a second transistor, a third transistor, and a fourth transistor arranged with current flow paths therethrough cascaded between the input node and ground, with an output node intermediate the second transistor and the third transistor configured to be coupled to a load to provide thereto a second DC voltage level; and
a capacitor arranged in parallel to the second transistor and the third transistor;
wherein in the first circuit branch, the first transistor and the third transistor have control nodes configured to receive a first control signal and are configured to be made conductive and non-conductive based on the first control signal having a first or a second value of the first control signal and the second transistor and the fourth transistor have control nodes configured to receive a second control signal in antiphase to the first control signal and are configured to be made conductive and non-conductive based on the second control signal having a first or a second value of the second control signal;
wherein in the second circuit branch, the first transistor and the third transistor have control nodes configured to receive the second control signal and are configured to be made conductive and non-conductive based on the second control signal having said first or said second value of the second control signal and the second transistor and the fourth transistor have control nodes configured to receive the first control signal and are configured to be made conductive and non-conductive based on the first control signal having said first or said second value of the first control signal;

at least one inter-branch circuit block comprising:
- a first capacitor coupled between a first capacitor node and a second capacitor node intermediate the first transistor and the second transistor in the first circuit branch;
- a second capacitor coupled between a third capacitor node and a fourth capacitor node intermediate the first transistor and the second transistor in the second circuit branch;
- a first inter-branch transistor having a control node configured to receive the second control signal and a current path therethrough between the first capacitor node in the first circuit branch and the fourth capacitor node in the second circuit branch; and
- a second inter-branch transistor having a control node configured to receive the first control signal and a current path therethrough between the third capacitor node in the second circuit branch and the second capacitor node in the first circuit branch.

8. The circuit of claim 7, comprising a plurality of said inter-branch circuit blocks in a cascaded arrangement between the first transistors and the second transistors in the first and second circuit branch.

9. The circuit of claim 7, wherein the circuit comprises a number j+1 of said inter-branch circuit blocks, with j>=0, wherein the second DC voltage level is an integer fraction 1/N of the first DC voltage level, with N=3+j.

10. The circuit of claim 7, wherein said capacitors in each of said first and said second circuit branches have a same capacitance.

11. The circuit of claim 7, wherein said first capacitor and said second capacitor in said at least one inter-branch circuit block have a same capacitance.

12. The circuit of claim 7, further comprising:
- a first control signal provided to the control node of the first and third transistors in the first branch, to the control node of respective second and fourth transistors in the second branch and to the control node of the second inter-branch transistor in each inter-branch circuit block; and
- a second control signal provided as an antiphase version of the first signal to the control node of the second and fourth transistors in the first branch, to the respective control node of first and third transistors in the second branch and to the control node of the first inter-branch transistor in each inter-branch circuit block.

13. A power supply system, comprising:
- a DC voltage source configured to provide a first DC voltage level referred to ground;
- a set of converter circuits comprising at least one circuit according to claim 7;
- a control circuit coupled to the set of converter circuits to provide control signals thereto;
- wherein the set of converter circuits is configured to be coupled to a set of respective loads to provide thereto at least one second DC voltage level.

14. An electronic device equipped with the power supply system of claim 13.

15. The electronic device of claim 14, wherein said DC voltage source is a battery and the electronic device is a portable electronic device.

* * * * *